United States Patent
Foo et al.

(10) Patent No.: US 12,147,262 B2
(45) Date of Patent: Nov. 19, 2024

(54) FIRST-IN FIRST-OUT BUFFER WITH LOOKAHEAD PERFORMANCE BOOSTER

(71) Applicant: Intel Corporation, Santa Clara, CA (US)

(72) Inventors: Kok Yoong Foo, Butterworth (MY); Sze Yin Lee, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 626 days.

(21) Appl. No.: 17/133,928

(22) Filed: Dec. 24, 2020

(65) Prior Publication Data
US 2021/0223815 A1  Jul. 22, 2021

Related U.S. Application Data

(60) Provisional application No. 63/081,134, filed on Sep. 21, 2020.

(51) Int. Cl.
*G06F 1/08* (2006.01)
*G06F 12/02* (2006.01)

(52) U.S. Cl.
CPC ............ *G06F 1/08* (2013.01); *G06F 12/023* (2013.01); *G06F 2212/251* (2013.01)

(58) Field of Classification Search
CPC ...... G06F 1/08; G06F 12/0215; G06F 12/023; G06F 2212/251
See application file for complete search history.

(56) References Cited

U.S. PATENT DOCUMENTS

| | | | | |
|---|---|---|---|---|
| 5,884,099 A | * | 3/1999 | Klingelhofer | G06F 5/10 710/72 |
| 6,226,698 B1 | * | 5/2001 | Yeung | G06F 5/10 710/57 |
| 6,480,942 B1 | * | 11/2002 | Hirairi | G06F 5/12 365/189.08 |
| 9,658,822 B1 | * | 5/2017 | O'Connor | G06F 5/14 |
| 9,736,086 B1 | * | 8/2017 | Ngo | H04L 47/6245 |
| 10,025,343 B2 | * | 7/2018 | Rifani | G06F 1/12 |
| 2004/0257856 A1 | * | 12/2004 | Liu | G06F 5/12 365/154 |
| 2009/0055677 A1 | * | 2/2009 | Chen | G06F 13/4059 713/600 |
| 2009/0103556 A1 | * | 4/2009 | Naven | H04J 3/0685 370/413 |
| 2009/0323728 A1 | * | 12/2009 | Koutsoures | G06F 5/12 711/E12.001 |
| 2016/0224481 A1 | * | 8/2016 | Ambroladze | G06F 12/0811 |
| 2018/0041434 A1 | * | 2/2018 | Florea | H04L 49/901 |
| 2018/0089114 A1 | * | 3/2018 | Hanscom | G06F 13/1673 |

* cited by examiner

*Primary Examiner* — Vincent H Tran
(74) *Attorney, Agent, or Firm* — Fletcher Yoder, P.C.

(57) ABSTRACT

A FIFO may use lookahead circuitry to boost performance and reduce data transfer latency by reducing the FIFO operation cycles when operating in the store and forward mode. The lookahead circuitry may increase data transfer rate of the FIFO between two integrated circuit devices that use different clock frequencies. The use of the lookahead circuitry with the FIFO may also reduce power consumption of the FIFO, allow storage media of the FIFO to be smaller, and free up valuable die space for other circuitry.

21 Claims, 7 Drawing Sheets

FIRST-IN FIRST-OUT BUFFER WITH LOOKAHEAD PERFORMANCE BOOSTER

CROSS-REFERENCE TO RELATED APPLICATIONS

This application claims priority to U.S. Provisional Application No. 63/081,134 filed Sep. 21, 2020, entitled "First-In First-Out Buffer with Lookahead Performance Booster," which is incorporated herein by reference in its entirety for all purposes.

BACKGROUND

The present disclosure relates generally to a first-in first-out buffer (FIFO) that may efficiently cross-forward data while avoiding clock crossing errors.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices are found in numerous electronic devices. Different integrated circuit devices increasingly communicate with one another despite operating at different clock frequencies. When one integrated circuit device operates at a higher clock frequency than another, to transfer information to or from one another, circuitry known as a first-in first-out buffer (FIFO) may be used. A FIFO allows a first integrated circuit device to write data into a memory device at a first rate based on its clock frequency and allows a second integrated circuit device to read the data out of the memory device at a second rate based on its clock frequency.

When the clock frequency of first integrated circuit device is slower than that of the second integrated circuit device, the FIFO may refrain from allowing the second integrated circuit device from reading the data while new data is being written. For example, data that is sent between the first and second integrated circuit devices may be packetized—that is, the data may be transmitted and read in groupings referred to as packets. Store and forward mode operation for a FIFO may allow the second integrated circuit device to read from the memory of the FIFO only once a worst-case threshold amount of time has passed since the first integrated circuit device has written the data to ensure that an entire packet has been written to the memory of the FIFO. For two integrated circuit devices, large clock differences could lead to substantial latencies. Moreover, a FIFO may contain a substantial amount of memory, taking up valuable integrated circuit die space.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

Figure 1:
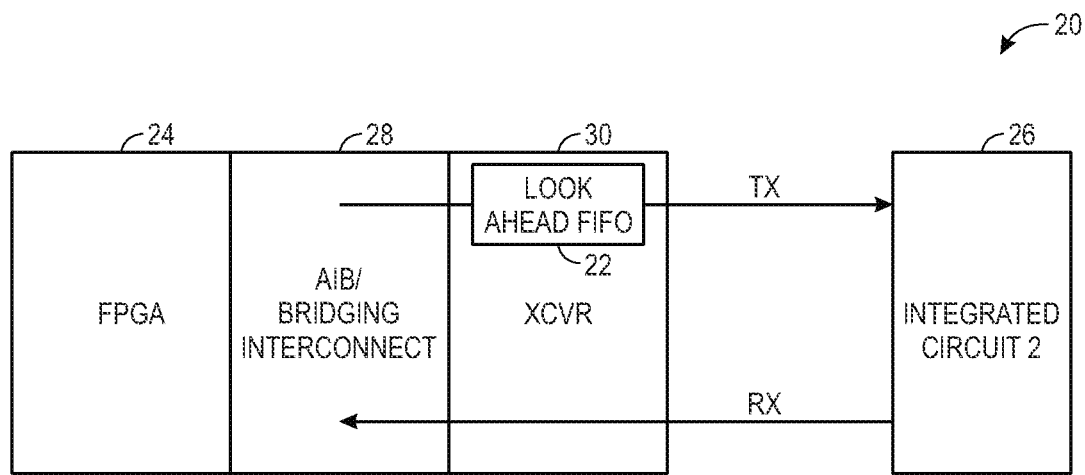
FIG. 1 illustrates a block diagram of a system including a FIFO that may perform lookahead operations to facilitate enhanced data communication between an FPGA and an integrated circuit, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

An integrated circuit device, such as an application specific integrated circuit (ASIC) or a programmable logic device (PLD) like a field programmable gate array (FPGA), may be part of an electronic device that communicates with a variety of other electronic devices. Different integrated circuit devices increasingly communicate with one another despite operating at different clock frequencies. For example, a first integrated circuit device, communicatively coupled to a second integrated device, may operate at a lower clock frequency than the second integrated circuit device.

The first integrated circuit may transfer information to the second integrated circuit via a first-in first-out buffer (FIFO). The FIFO allows the first integrated circuit device to write data into a memory of the FIFO at a first rate and allows the second integrated circuit device to read the data out of the memory at a second rate. The first rate may be based on a first clock frequency associated with the first integrated circuit and the second rate may be based on a second clock frequency associated with the second integrated circuit. Moreover, the first and second integrated circuit devices may transfer data in packetized form—that is, the data may be written to the memory and read from the memory in groupings referred to as packets. A number of data bits (or data bytes) grouped in each packet may indicate a packet size.

The FIFO may perform FIFO operations during a FIFO operation cycle to transfer data between the first integrated circuit and the second integrated circuit. For example, in each FIFO operation cycle, the first integrated circuit device may write a packet to the memory using the first clock frequency, slower than the second clock frequency. Moreover, the FIFO may prevent the second integrated circuit device from reading the data while new data is being written to the memory.

The FIFO may operate in a store and forward mode to transfer the packets. When using the store and forward mode, the FIFO may allow the second device to read from the memory of the FIFO only after time period associated with receiving a complete packet in each FIFO operation cycle. That is, the FIFO may receive and store (e.g., clock-in) a complete packet of data before allowing transmission of (e.g., clocking-out) the data. For example, the threshold amount of time may include sufficient time to receive a packet completely with additional buffer time to ensure that an entire packet has been written to the memory of the FIFO. As such, large clock frequency differences between the first clock frequency and the second clock frequency and large packet size may lead to substantial latencies when transferring data between two integrated circuit devices. Moreover, the FIFO may require a substantial amount of memory, taking up valuable die space on an integrated circuit device.

In this disclosure, the FIFO may use lookahead circuitry to boost performance and reduce data transfer latency by reducing the FIFO operation cycles when operating in the store and forward mode. Indeed, the lookahead circuitry may increase data transfer rate of the FIFO between two integrated circuit devices that use different clock frequencies. The use of the lookahead circuitry with the FIFO may also reduce power consumption of the FIFO, allow storage media of the FIFO to be smaller, and free up valuable die space for other circuitry, as will be appreciated. Moreover, it should be appreciated that circuitry and techniques described herein are by the way of example and, in different embodiments, different circuitry may be used to perform operations associated with using a lookahead circuitry with a respective FIFO.

With the foregoing in mind, FIG. 1 illustrates a block diagram of a system 20 that may implement a FIFO 22. The system 20 of FIG. 1 may include an integrated circuit 24 and an integrated circuit 26. The FIFO 22 include a lookahead circuitry. In specific embodiments, the integrated circuit 24 may include a field programmable gate array. Moreover, the integrated circuit 26 may implement a hardened transceiver protocol, such as different generations of Ethernet, Peripheral Component Interconnect Express (PCIe), Compute Express Link (CXL), a high speed serial interface (HSST), a hard intellectual property (IP) core such as High Bandwidth memory (HBM), Ultra Path Interconnect (UPI), among other things.

The system 20 may also include a bridge interconnect circuitry 28, such as an Advance Interface Bus (AIB), and a transceiver (XCVR) 30, including the FIFO 22, to facilitate data communication between the integrated circuit 24 and the integrated circuit 26. In the depicted embodiment, the integrated circuit 24 may transmit data to the integrated circuit 26 via the bridge interconnect circuitry 28 and the transceiver 30.

It should be appreciated that in different embodiments, each depicted components of the system 20 may be implemented in different arrangements. For example, in some embodiments, the transceiver 30 may be implemented by the integrated circuit 24, the integrated circuit 26, or other integrated circuit not shown in FIG. 1. In other embodiments, the transceiver 30 may be implemented as a separate component between the bridge interconnect circuitry 28 and the integrated circuit 24 or the integrated circuit 26, or may be integrated into the bridge interconnect circuitry 28.

In different embodiments, the integrated circuit 24 and the integrated circuit 26 may operate according to different clock frequencies. In one embodiment, the integrated circuit 24 may operate according to a clock frequency (e.g., between 400 Megahertz (MHz) to 500 MHz). That is, the integrated circuit 24 clock frequency may be predetermined or programmable to use a clock frequency between 400 MHz to 500 MHz. Moreover, the integrated circuit 26 may operate according to a higher clock frequency (e.g., 600 MHz, 800 MHZ, 1 Gigahertz (GHz), 2 GHZ). Accordingly, if not compensated for, the integrated circuit 26 may clock-in 10 data bits for every 4 data bits clocked-out of the integrated circuit 24. Moreover, it should be appreciated that in other embodiments, the integrated circuit 24 and the integrated circuit 26 may use different clock frequencies. For example, the integrated circuit 24 may operate according to a higher clock frequency than the integrated circuit 26.

That said, the FIFO 22 may cross-over the communication data between the integrated circuit 24 and the integrated circuit 26 by compensating for a difference between a clock frequency of a transmitting device, the integrated circuit 24, and a clock frequency of a receiving device, the integrated circuit 26. The FIFO 22 may operate according a store and forward mode. Moreover, the FIFO 22 may include lookahead circuitry to look ahead and continuously transfer data using a reduced FIFO operation cycle when operating according to the store and forward mode. Although the integrated circuit 24 is shown by way of example as an integrated circuit that may be used with the FIFO 22, it should be understood that any suitable integrated circuit having mismatched clocks may employ and benefit from the FIFO 22.

Figure 2:
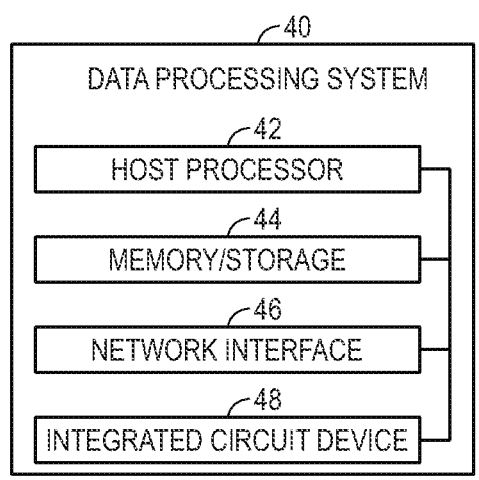
FIG. 2 depicts a data processing system that may include the FIFO with lookahead circuitry, in accordance with an embodiment.

In one embodiment, the FIFO may be included in a data processing system 40. For example, an integrated system 48 of FIG. 2 may include the FIFO. The data processing system 40 may include a host processor 42 (e.g., a central-processing unit (CPU)), memory and/or storage circuitry 44, a network interface 46, and the integrated circuit 48. The data processing system 40 may include more or fewer components (e.g., electronic display, user interface structures, application specific integrated circuits (ASICs)).

The host processor 42 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 40 (e.g., to perform encryption, decryption, machine learning, video processing, voice recognition, image recognition, data compression, database search ranking, bioinformatics, network security pattern identification, spatial navigation, sensing or transmitting using a phased array, communicating via a MIMO wireless system, or the like).

The memory and/or storage circuitry 44 may include random access memory (RAM), read-only memory (ROM), one or more hard drives, flash memory, or the like. The memory and/or storage circuitry 44 may hold data to be processed by the data processing system 40. In some cases, the memory and/or storage circuitry 44 may also store configuration programs (bitstreams) for programming a programmable logic device (e.g., the integrated circuit 48) that may include the FIFO. The memory and/or storage circuitry 44 may, additionally or alternatively, store instructions to program the FIFO. The network interface 46 may allow the data processing system 40 to communicate with other electronic devices. The data processing system 40 may include several different packages or may be contained within a single package on a single package substrate.

The host processor 42 may cause a programmable logic fabric of the integrated circuit 48 to be programmed tp perform different functions associated with the FIFO. For instance, the host processor 42 may instruct that configuration data (bitstream) stored on the memory and/or storage circuitry 44 or cached in sector-aligned memory of the integrated circuit 48 to be programmed into the programmable logic fabric of the integrated circuit 48. The configuration data (bitstream) may represent a circuit design for the FIFO, as will be appreciated.

In one example, the data processing system 40 may be part of a data center that processes a variety of different requests. For instance, the data processing system 40 may receive a data processing request via the network interface 46 to perform encryption, decryption, machine learning, video processing, voice recognition, image recognition, data compression, database search ranking, bioinformatics, network security pattern identification, spatial navigation, digital signal processing, or some other specialized task. Some or all of the components of the data processing system 40 may be virtual machine components running on physical circuitry (e.g., managed by one or more hypervisors or virtual machine managers). Whether physical components or virtual machine components, the various components of the data processing system 40 may be located in the same location or different locations (e.g., on different boards, in different rooms, at different geographic locations). Indeed, the data processing system 40 may be accessible via a computing service provider (CSP) that may provide an interface to customers to use the data processing system 40 (e.g., to run programs and/or perform acceleration tasks) in a cloud computing environment.

High-Level Architecture of FIFO with Lookahead Performance Booster

Figure 3:
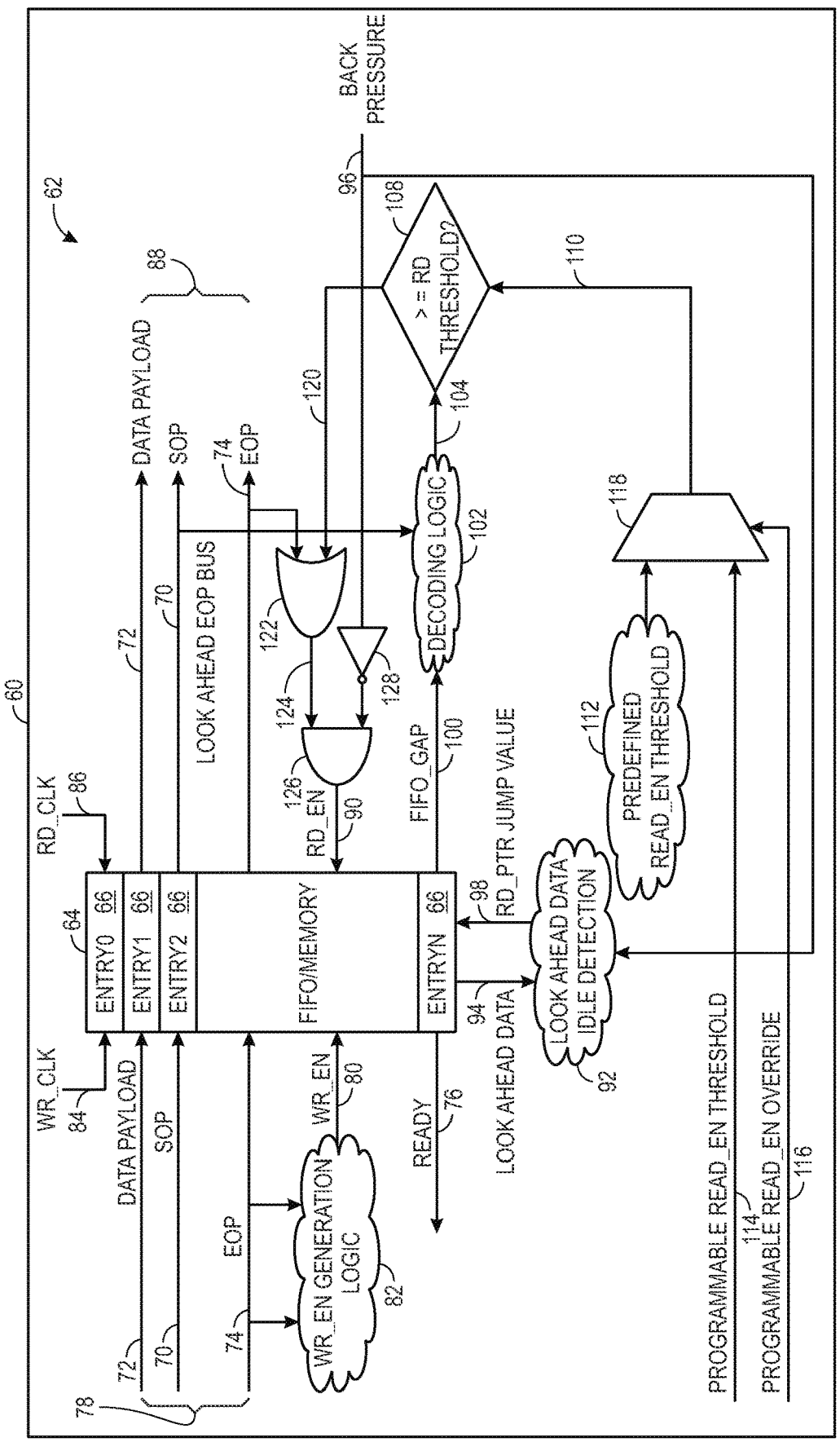
FIG. 3 depicts a block diagram of a FIFO with lookahead circuitry that may transfer data with boosted performance, in accordance with an embodiment.

FIG. 3 depicts a high-level block diagram of a FIFO 60 with lookahead circuitry 62. The FIFO 60 may be part of a system, such as the system 20 of FIG. 1. In some embodiments, the FIFO 60 may correspond to the FIFO 22 of FIG. 1. In the depicted block diagram, the FIFO 60 may transfer packet-based data between a transmitting device and a receiving device. For example, the transmitting device may be the integrated circuit 24 and the receiving device may be the integrated circuit 26 of FIG. 1. The FIFO 60 may receive transmitted data associated with each packet and store the received data on a memory 64 of the FIFO 60. The FIFO 60 may store the received data in the memory 64 in segmented portions referred to as data entries 66. For example, each data entry may include 128 data bytes. Depending on the size of the packets, a packet may be stored using a different number of the data entries 66. Moreover, the FIFO 60 may transmit the stored data using the store and forward mode.

The transmitting device and the receiving device may operate according to different clock frequencies. The FIFO 60 may continuously transfer data in the store and forward mode, using the lookahead circuitry 62, by compensating for the difference between a clock frequency of the transmitting device and a clock frequency of the receiving device, as will be appreciated. The FIFO 60 may use the lookahead circuitry 62 to look ahead and continuously transmit the stored data based on receiving a threshold number of data entries, before a complete packet is received, or receiving a complete packet.

In different embodiments, a complete packet may include different number of data bits. As such, in different embodiments, a packet may include a different packet size. For example, the packets may include a data structure including an start of the packet (SOP) 70 indicator, data payload 72, and an end of the packet (EOP) 74 indicator. In other embodiments, the packets may include different data structures.

The FIFO 60 may provide a ready signal 76 to the transmitting device to indicate completion of an FIFO operation cycle or start of a subsequent FIFO operation cycle. The transmitting device may start transmission of the data after receiving the ready signal 76. An inlet 78 of the FIFO 60 may receive the transmitted data. In one embodiment, the FIFO 60 may start receiving the transmitted data based on receiving a write enable signal 80. In one embodiment, the lookahead circuitry 62 may include a write enable generation logic 82 to generate the write enable signal 80 based on monitoring and detecting the SOP 70 and EOP 74 of the packets. For example, the write enable generation logic 82 may provide the write enable signal 80 when detecting the SOP 70 and may remove the write enable signal 80 when detecting the EOP 74 or when no input data is detected. In different embodiments, the write enable generation logic 82 may be part of the transmitting device, the FIFO 60, or other circuitry.

In different embodiments, the inlet 78 may include one or more data bus to receive the data. The FIFO 60 may then store the received data in the data entry form. The FIFO 60 may use a write clock signal 84, received from the transmitting device, to clock-in (i.e., receive and store) the data. That is, the FIFO 60 may store the received data at a pace indicated by the write clock signal 84.

With the foregoing in mind, the FIFO 60 may clock-out (i.e., allow transmission of) the received data using a read clock signal 86, received from the receiving device. In different embodiments, an outlet 88 may also include one or more data bus to transmit the data. As such, the FIFO 60 may allow transmission of each packet in the original form that is received and stored. That is, the output data may include the SOP 70, the data payload 72, and EOP 74. Moreover, receiving the write clock signal 84 and the read clock signal 86 may allow the FIFO 60 to operate according to a fully synchronous or asynchronous data transfer mode.

In each FIFO operation cycle, the FIFO 60 may use lookahead circuitry 62 to clock-out the data based on detecting storage of the threshold number of data entries in the memory 64 or a storage of a complete packet on the memory 64, to reduce each respective FIFO operation cycle. In one embodiment, the FIFO 60 may clock-in the threshold number of data entries before detecting the EOP 74 in a respective FIFO operation cycle. That is, the FIFO 60 may start clocking-out the stored data while clocking-in the rest of the data of the respective packet. As such, the duration of each respective FIFO operation cycle may be reduced.

In another embodiment, the FIFO 60 may clock-in a complete packet before receiving the threshold number of data entries in a respective FIFO operation cycle. In this embodiment, the FIFO 60 may start clocking-out the entire packet based on receiving the EOP 74. As such, the duration of each FIFO operation cycle may be reduced based on clocking-out the stored data after receiving the EOP 74 which may eliminate unnecessary buffer time after receiving the complete packet to ensure reception of the complete packet.

Moreover, in each FIFO operation cycle, the FIFO 60 may start clocking-out the stored data based on receiving a read enable signal 90. For example, the lookahead circuitry 62 may include circuitry to track a number of stored data entries 66 on the memory 64 and detect a respective EOP 74 in each FIFO operation cycle. The lookahead circuitry 62 may provide the read enable signal 90 to the FIFO 60 based on monitoring and detecting storage of the threshold number of data entries in the memory 64 or based on monitoring and detecting the EOP 74, as will be appreciated.

The lookahead circuitry 62 may also include lookahead data idle detection circuitry 92 to track a jump in a location of a read pointer, with respect to the data entries 66, each time a new packet is received and stored on the memory 64. The lookahead data idle detection circuitry 92 may receive lookahead data 94 from the FIFO 60 and a backpressure signal 96 from the receiving device.

In one embodiment, the lookahead data 94 may provide a current storage location of the SOP 70 and the EOP 74 on the data entries 66, and may indicate if idle data (e.g., null data) exists on the memory. Based on the lookahead data 94, the lookahead data idle detection circuitry 92 may output a pointer jump signal 98 indicative of a jump in storage location of the SOP 70 and the EOP 74 of the input packet. Subsequently, the FIFO 60 may use the pointer jump signal 98 to rearrange the storage location of the SOP 70, the data payload 72, and the EOP 74 on the data entries 66 to allow correct and uninterrupted transmission of the stored packet to the receiving device when using the lookahead circuitry 62.

The receiving device may provide the backpressure signal 96 to the lookahead circuitry 62. In the depicted embodiment, the lookahead data idle detection circuitry 92 may receive the backpressure signal 96. For example, the backpressure signal 96 may indicate that a memory of the receiving device is full or otherwise the receiving device is not able to receive additional data. Moreover, the lookahead circuitry 62 may remove the read enable signal 90 to idle the FIFO 60 based on a state of the backpressure signal 96, as will be discussed below. When the FIFO 60 is idle, the FIFO 60 may stop receiving new data, prevent transmission of the stored data to the receiving device, or both. As such, the lookahead data idle detection circuitry 92 may halt tracking the read pointer location.

With the foregoing in mind, the FIFO 60 may provide a FIFO gap signal 100 to a decoding logic circuit 102 associated with the lookahead circuitry 62. The FIFO gap signal 100 may indicate a pointer gap value indicative of a distance between a read pointer location and a write pointer location of the memory 64 with respect to the data entries 66 of the memory 64. The FIFO 60 may provide the FIFO gap signal 100 after receiving the pointer jump signal 98 and rearranging the packet storage location on the data entries 66. Moreover, the FIFO 60 may provide the pointer gap value based on the difference between the clock frequency of the transmitting device and the clock frequency of the receiving device, as will be appreciated.

During each FIFO operation cycle, the decoding logic circuit 102 may detect (or receive) the respective SOP 70 of each packet and receive the FIFO gap signal 100 to determine the number of data entries stored on the memory 64. For example, the decoding logic circuit 102 may count the number of stored data entries 66 after detecting (or receiving) the SOP 70. Subsequently, the decoding logic circuit 102 may provide an output signal 104 indicative of the number of stored data entries 66 in each FIFO operation cycle to comparator circuitry 108.

In parallel to the operations of the decoding logic, the lookahead circuitry 62 may provide a read enable threshold signal 110 to the comparator circuitry 108. The read enable threshold signal 110 may indicate the threshold number of data entries that may be received by the FIFO 60 and stored on the memory 64 before clocking out the stored data. That said, the read enable threshold signal 110 may be selectable between a predetermined read enable threshold signal 112 and a programmable read enable threshold signal 114. The predetermined read enable threshold signal 112 may be indicative of a predetermined read enable threshold value. Moreover, the programmable read enable threshold signal 114 may be indicative of a calculated read enable threshold value, and may be different from the predetermined read enable threshold value.

The predetermined read enable threshold signal 112 and the programmable read enable threshold signal 114 may each indicate the threshold number of data entries based on a size of the packets, a clock frequency of the transmitting device, and a clock circuitry of the receiving device. The predetermined read enable threshold signal 112 may be predetermined based on a largest possible clock frequency difference between the clock frequency of the transmitting device and the clock frequency of the receiving device.

As such, the predetermined read enable threshold signal 112 may indicate a worst case clock frequency difference between the clock frequency of the transmitting device and the clock frequency of the receiving device. Accordingly, the predetermined read enable threshold signal 112 may be predetermined based on the lowest clock frequency (e.g., minimum clock frequency) of the transmitting device. For example, as described with respect to FIG. 1, the integrated circuit 24 of FIG. 1 may use a clock frequency of 400 MHz to transmit the data. Moreover, the integrated circuit 26 of FIG. 1 my use a clock frequency of 1 GHz to clock-in the stored data from the FIFO 60.

The lookahead circuitry 62 may determine the programmable read enable threshold signal 114 based on detecting a smaller clock frequency difference between the clock frequency of the transmitting device and the clock frequency of the receiving device compared to the worst case clock frequency difference. The lookahead circuitry 62 may use the programmable read enable threshold signal 114 to fine tune and enhance performance of the FIFO 60, by reducing the duration of each FIFO operation cycle, when the write clock signal 84 is higher than the lowest clock frequency of the transmitting device. For example, in some embodiments, the integrated circuit 24 may use a clock frequency of 500 MHz instead of 400 MHZ, as described with respect to FIG. 1.

Moreover, the lookahead circuitry 62 may use a multiplexer (MUX) 118 to output the read enable threshold signal 110 to the comparator circuitry 108. The MUX 118 may receive the predetermined read enable threshold signal 112, the programmable read enable threshold signal 114, and a programmable read enable override signal 116. Moreover, the MUX 118 may use the programmable read enable override signal 116 to select between the predetermined read enable threshold signal 112 and the programmable read enable threshold signal 114. In different embodiments, the transmitting device, the receiving device, the lookahead circuitry 62, or other circuitry may determine the predetermined read enable threshold signal 112, programmable read enable threshold signal 114, and the programmable read enable override signal 116.

With the foregoing in mind, the comparator circuitry 108 may compare the output signal 104 of the decoding logic circuit 102 and the read enable threshold signal 110 to determine whether the threshold number of data entries is stored on the memory 64. In each FIFO operation cycle, the comparator circuitry 108 may output a threshold true signal 120 when the output signal 104 of the decoding logic circuit 102 indicates equal or greater number of stored data entries 66 compared to the read enable threshold signal 110. As such, the threshold true signal 120 indicates that the FIFO 60 includes the threshold number of data entries stored on the memory 64. Moreover, the lookahead circuitry 62 may provide the read enable signal 90 in response to the comparator circuitry 108 outputting the threshold true signal 120.

As discussed above, in each FIFO operation cycle, the FIFO 60 may start clocking-out the stored data while receiving a remaining portion of a respective packet, based on receiving the read enable signal 90. In the depicted embodiment, the lookahead circuitry 62 may use an OR logic gate 122 to provide the read enable signal 90 based on receiving the threshold true signal 120 or receiving EOP 74. As such, the FIFO 60 may either clock-out the stored data before receiving and storing a complete packet or clock-out a complete packet after receiving and storing the complete packet. Moreover, the lookahead circuitry 62 may include other logic circuitry for providing the read enable signal 90, as discussed below. Furthermore, it should be appreciated that in different embodiments, the lookahead circuitry 62 may include different circuitry for providing the read enable signal 90.

In different embodiments, the FIFO 60 may transfer short packets or long packets. The short packets and the long packets may be defined based on a size of the data entries 66 and the clock frequency difference between the clock frequency of the transmitting device and the clock frequency of the receiving device. Specifically, the FIFO 60 may store a short packet using fewer data entries 66 than the threshold number of data entries. Accordingly, when transferring short packets, the FIFO 60 may receive the read enable signal 90 from the lookahead circuitry 62 based on clocking-in each short packet completely (detecting a respective EOP 74 of each short packet) in a respective FIFO operation cycle. As such, the FIFO 60 may start clocking-out the stored short packet.

In contrast, when transferring a respective long packet in a respective FIFO operation cycle, the FIFO 60 may start clocking-out the respective long packet before the long packet is completely stored on the memory 64 and while clocking-in a remaining portion of the respective long packet. As described above, the lookahead circuitry 62 may provide the read enable signal 90 in each respective FIFO operation cycle based on determining that the threshold number of data entries is received and stored on the memory 64.

As such, the lookahead circuitry 62 may reduce each FIFO operation cycle when operating in the store and forward mode by transferring data entries 66 based on monitoring and detecting that the threshold number of data entries is stored on the memory 64 of the FIFO 60 and based on monitoring and detecting the EOP 74. The FIFO 60 may clock-out a respective stored short packet or start clocking-out a long packet while receiving a remaining portion of the long packet using reduced cross-over time when operating according to the store and forward mode. The FIFO 60 may operate with no regard to a sufficient time for receiving a completed packet or an additional buffer time to ensure that an entire packet has been written to the memory 64 of the FIFO 60.

As discussed above, the FIFO 60 may become idle based on receiving the backpressure signal 96 from the receiving device. When receiving the backpressured signal, the lookahead circuitry 62 may remove the ready signal 76 to stop the FIFO 60 from receiving input data from the transmitting device and to prevent transmission of data entries 66 to the receiving device.

In the depicted embodiment, the lookahead circuitry 62 may use an AND logic gate 126 to provide the read enable signal 90 based on receiving an output signal 124 of the OR logic gate 122 and a low backpressured signal. For example, the backpressured signal may be low during a normal operation of the receiving device. The lookahead circuitry 62 may include an inverting logic gate 128 to provide a high backpressure signal 96 to the AND logic gate 126 during the normal operation of the receiving device along with the output signal 124 of the OR logic gate 122. As such, when the receiving device is not backpressured, the AND logic gate 126 may output the read enable signal 90 based on the output of the OR logic gate 122. However, the inverting logic gate 128 and the AND logic gate 126 of the lookahead circuitry 62 may remove the read enable signal 90 when the backpressured signal is high. Moreover, the lookahead data idle detection circuitry 92 may also receive the backpressured signal. The lookahead data idle detection circuitry 92 may halt tracking the read pointer location based on receiving the backpressured signal.

In one embodiment, the FIFO 60 may use a PCIe store and forward mode to clock-out the stored data to a hardened PCIe protocol. In different embodiments, the FIFO 60 may transfer data to other suitable protocols, such as Ethernet, CXL, HBM, etc. For example, the data is crossed over from an FPGA through Intel AIB interface to a PCIe link partner, as shown in FIG. 1. That said, any other suitable integrated circuit and interface buss may be used. A performance of a hardened PCIe protocol may be measured based on data transfer latency and the number of received packets within a time period. In each PCIe store and forward mode operation, the lookahead circuitry 62 may use the read enable signal 90 or the EOP 74 to reduce each FIFO operation cycle and increase a performance of the system. That is, the FIFO 60 may use the lookahead circuitry 62 to achieve faster data transfers from a storage medium regardless of receiving a short packet or long packet, thereby boosting a hardened PCIe protocol performance in the system. Indeed, using the FIFO 60 if FIG. 3 with the PCIe store and forward mode may boost PCIe performance in a store and forward mode system, reduce system latency, and allow the storage media of the FIFO 60 to be smaller, thereby reducing total power consumption and freeing valuable die space.

Figure 4:
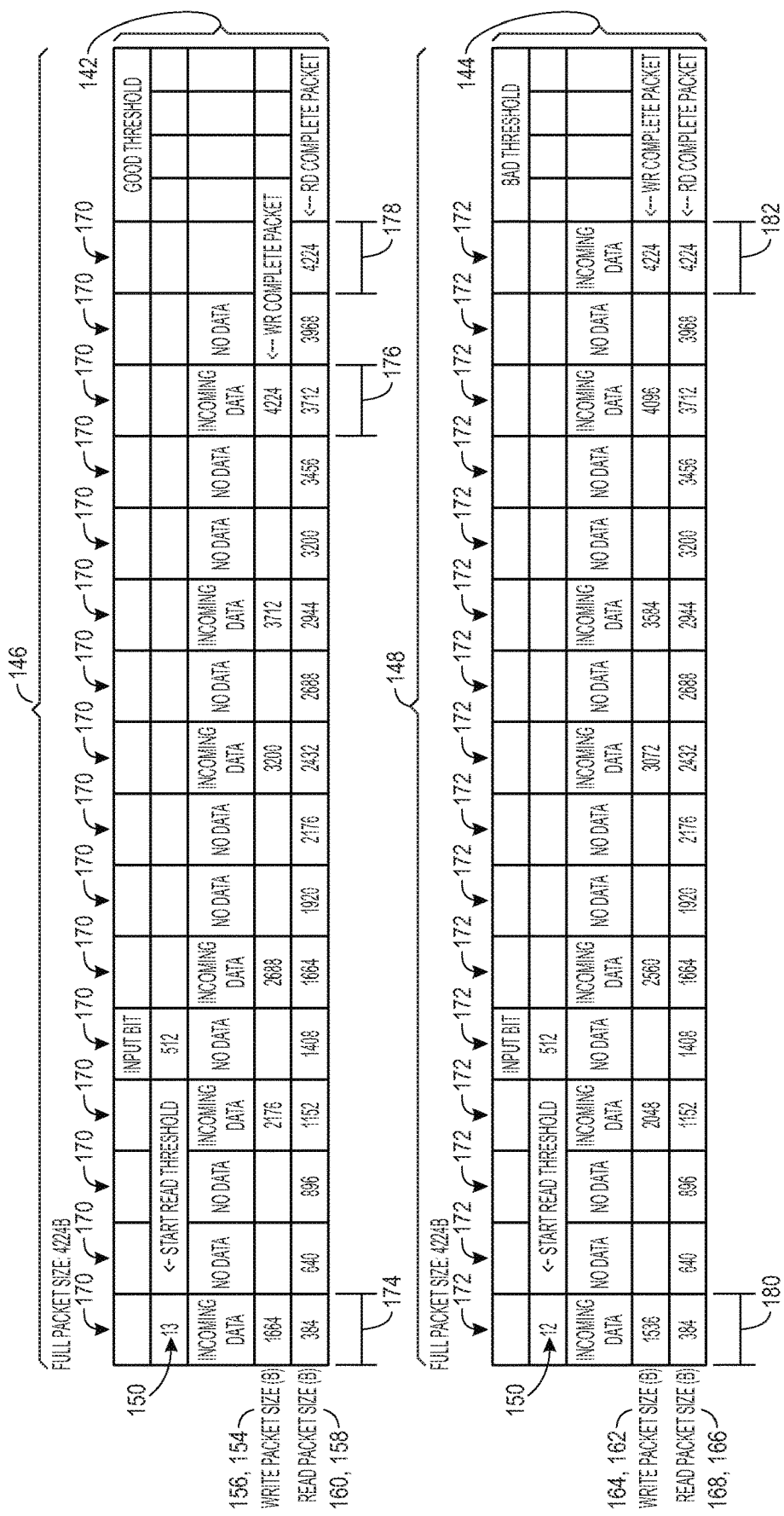
FIG. 4 depicts a first and a second table illustrating relationships between input data and output data during an operation cycle of the FIFO of FIG. 3, in accordance with a first embodiment and a second embodiment.

FIG. 4 depicts FIFO operation cycle 140 with respect to a first embodiment and second embodiment of the FIFO 60 of FIG. 3. Specifically, FIG. 4 depicts cumulative number of stored data bytes relative to a cumulative number of read data bytes during the FIFO operation cycle 140 with respect to a first embodiment and a second embodiment of FIFO 60 of FIG. 3. In the first and second depicted embodiments, a first table 142 and a second table 144 may illustrate the FIFO 60 transferring a packet with the same size, with respect to segmented time windows of the first table 146 and segmented time windows of the second table 148, between a transmitting device and a receiving device. The respective packets of the first and the second embodiments may be long packets. That is, the FIFO 60 may start clocking-out the stored data of the packets before detecting the EOP of the respective packets in the first and the second embodiments. However, in the first embodiment, the FIFO 60 is operating based on detecting a first threshold number of data entries 150 stored on the memory 64 before clocking-out the stored data, while in the second embodiment, the FIFO 60 is operating based on detecting a second threshold number of data entries 152 stored on the memory 64 before clocking out the stored data, different from the first threshold number of data entries 150.

A first row of the first table 154 may illustrate a first cumulative write data bytes 156. The first cumulative write data bytes 156 may be indicative of a cumulative number of stored data bytes clocked-in to the FIFO 60 with respect to each respective time window of the segmented time windows. Moreover, a second row the first table 158 may illustrate a first cumulative read data bytes 160. The first cumulative read data bytes 160 may be indicative of a cumulative number of read data bytes clocked-out to the receiving device with respect to each of the segmented time windows.

Similarly, a first row of the second table 162 may illustrate a second cumulative write data bytes 164. The second cumulative write data bytes 164 is indicative of a cumulative number of stored data bytes clocked-in to the FIFO 60 with respect to each respective time window of the segmented time windows. Moreover, a second row of the second table 166 may illustrate a second cumulative read data bytes 168. The second cumulative read data bytes 168 may be indicative of a cumulative number of read data bytes clocked-out to the receiving device with respect to each of the segmented time windows.

Each column 170 of the first table 142 may correspond to a respective time window of the segmented time windows of the first table 146. Moreover, each column 170 of the first table 142 may illustrate the first cumulative write data bytes 156 with respect to the first cumulative read data bytes 160 in a respective time window of the first table 142. Furthermore, each column 172 of the second table 144 may correspond to a respective time window of the segmented time windows of the second table 148. Moreover, each column 172 of the second table 144 may illustrate the second cumulative write data bytes 164 with respect to the second cumulative read data bytes 168 in a respective time window of the second table 144.

As discussed above with respect to FIG. 3, the threshold number of data entries may be smaller when using a write clock signal (such as the write clock signal 84 of FIG. 3) with higher frequency compared to the minimum clock frequency used for calculating the value of the predetermined read enable threshold signal 112. For example, the predetermined read enable threshold signal 112 may be calculated based on a minimum clock frequency of 400 MHZ. However, when the write clock signal operates at 500 MHZ, the programmable read enable threshold signal 114 may be calculated to provide a smaller threshold number of data entries for the read enable threshold signal 110 of FIG. 3. As such, the lookahead circuitry 62, associated with the FIFO 60, may use the programmable read enable threshold signal 114 to reduce duration of the FIFO operation cycle 140 and increase system performance.

However, using an incorrect threshold number of data entries in may result in functional error when using the lookahead circuitry 62 (as described with respect to FIG. 3) with the FIFO store and forward mode. Correct calculation of the threshold number of data entries may prevent the FIFO 60 from clocking-out the stored data bytes at a faster or equivalent rate as clocking-in the data bytes. That is, in the FIFO operation cycle 140, correct calculation of the threshold number of data entries may allow transmission of a respective packet at an outlet of a the FIFO 60 (or FIFO 22 of FIG. 1) to be terminated one or more clock cycles after completely clocking-in the packet at the inlet of the FIFO 60.

Referring back to FIG. 4, the first table 142 and the second table 144 may transfer a PCIe protocol packet. The PCIe protocol packet may include 16 bytes of header information and 512 bytes of data payload. That is, a PCIe protocol packet may include 4224 data bytes. Moreover, the write clock signal may operate at 400 MHz frequency and the read clock signal may operate at 1 GHz frequency. As such, the FIFO 60 may clock-out 256 data bytes during each respective time window of the segmented time windows of the first table 146 and the segmented time windows of the second table 148. For example, the write clock signal may be associated with the integrated circuit 24 of FIG. 1 and the read clock signal may be associated with the integrated circuit 26 of FIG. 1.

Based on the respective frequencies of the write clock signal and the read clock signal, every 10 read clock signals may correspond to 4 write clock signals. Accordingly, if not compensated for, every 10 read clock signal may correspond to at least 6 invalid data bits. Referring back to FIG. 4, the FIFO 60 may clock-out the stored data entries after clocking-in a different threshold number of data entries in the first embodiment and the second embodiment. The first threshold number of data entries 150 may be 13 data entries and the second threshold number of data entries 152 may be 12 data entries. Each data entry may include 128 data bytes.

Based on using the first threshold number of data entries 150 in the first embodiment or the second threshold number of data entries 152 in the second embodiment, the FIFO 60 may attempt to clock-out the EOP of the respective packets before or after clocking-in the complete packet. Clocking-out the EOP of the respective packets before or after clocking-in the complete packet is also dependent on the packet size of 4224 data bytes, the write clock signal frequency of 400 MHZ, and the read clock signal frequency of 1 GHz, used by the system.

With that in mind, in the first table 142, the FIFO 60 may start clocking-out the stored data at a first time window 174 after storing 13 data entries (1664 data bytes) of the respective packet, while clocking-in the rest of the packet data. As such, in the first embodiment, the FIFO 60 may finish clocking-in the data at a second time window 176 and may finish clocking-out the stored data at a third time window 178, at a later time than the second time window 176. Accordingly, the FIFO 60 may successfully transfer the respective packet using the first threshold number of data entries 150 (13 data entries or 1664 data bytes).

Moreover, in the second table 144, the FIFO 60 may start clocking-out the stored data at a fourth time window 180 after storing 12 data entries (1536 data bytes) of the respective packet, while clocking-in the rest of the data. However, in the second embodiment, the FIFO 60 may finish clocking-in the data and clocking-out the stored data simultaneously at a fifth time window 182. That is, when using the second threshold number of data entries 152, the FIFO 60 may attempt clocking-out the stored data at an equivalent or faster rate than storing the data because of starting to clock-out the stored data early (when only 1536 data bytes are stored on the memory 64). Based on the write clock signal frequency, read clock signal frequency, and the packet size, the smallest possible threshold number of data entries may be 13 data entries for boosting performance and reducing data transfer latency of the FIFO 60 in the store and forward mode.

FIGS. 5-8 depict simulation data graphs illustrating input data and output data of a FIFO operating in store and forward mode, with and without the lookahead circuitry (lookahead circuitry 62 of FIG. 3) to transfer (e.g., crossover) a long packet and a short packet, in different embodiments. In FIGS. 5-8, the respective FIFOs may transfer a packet using a write clock signal frequency of 400 MHz and a read clock signal frequency of 1 GHz.

Figure 5:
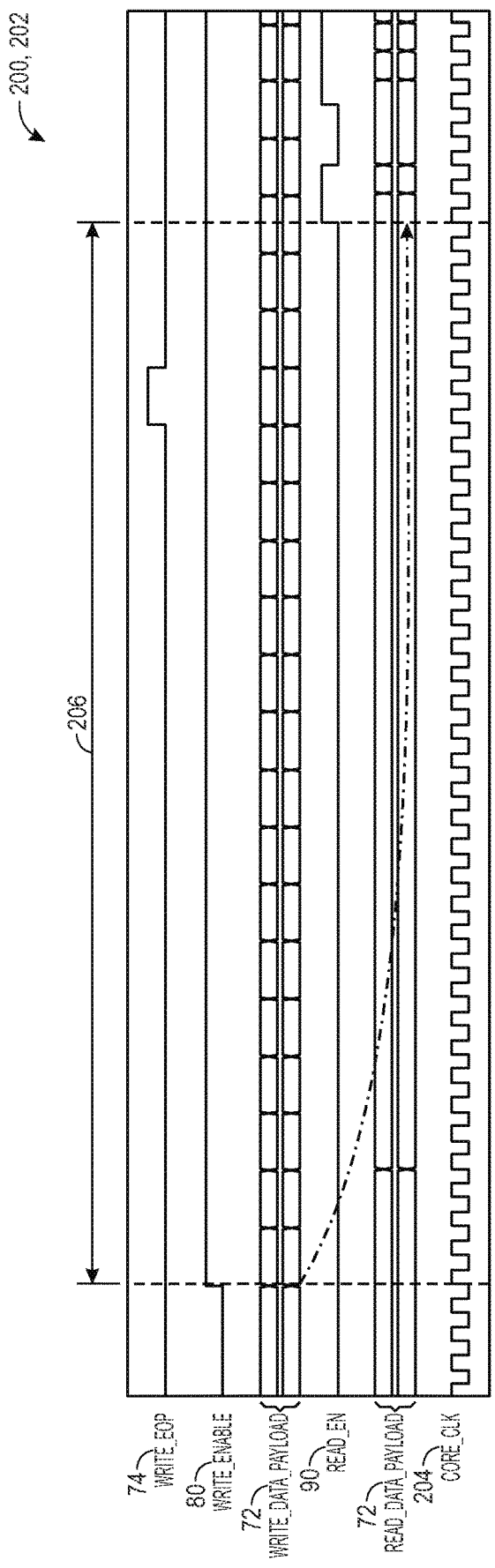
FIG. 5 depicts a data graph to illustrate data signals of a FIFO crossing-over a long packet operating at store and forward mode without performing lookahead operations.

Referring now to FIG. 5, a data graph 200 may illustrate data signals of a FIFO 202 (not shown) crossing-over data when operating at store and forward mode to transfer a long packet with 512 data bytes. The FIFO 202 associated with data graph 200 of FIG. 5 may not perform lookahead operations or include lookahead circuitry. The depicted signals of FIFO 202 may be described with respect to signals described above with respect to FIG. 3, when the FIFO 60 does not include or use the lookahead circuitry 62. For example, the data graph 200 may illustrate a relationship between the EOP 74, the write enable signal 80, the data payload 72 being written, the read enable signal 90, the data payload 72 being read, and a core clock signal 204 of the FIFO 202. The FIFO 202 may allow transmission of stored data (data payload 72) from the memory of the FIFO 202 only after a worst-case threshold amount of time 206 since start of clocking-in the data payload 72. In the depicted example, the worst-case threshold amount of time 206 corresponds to 37 clock cycles of the core clock signal 204. The worst-case threshold amount of time may ensure that an entire packet has been written to the memory of the FIFO.

Figure 6:
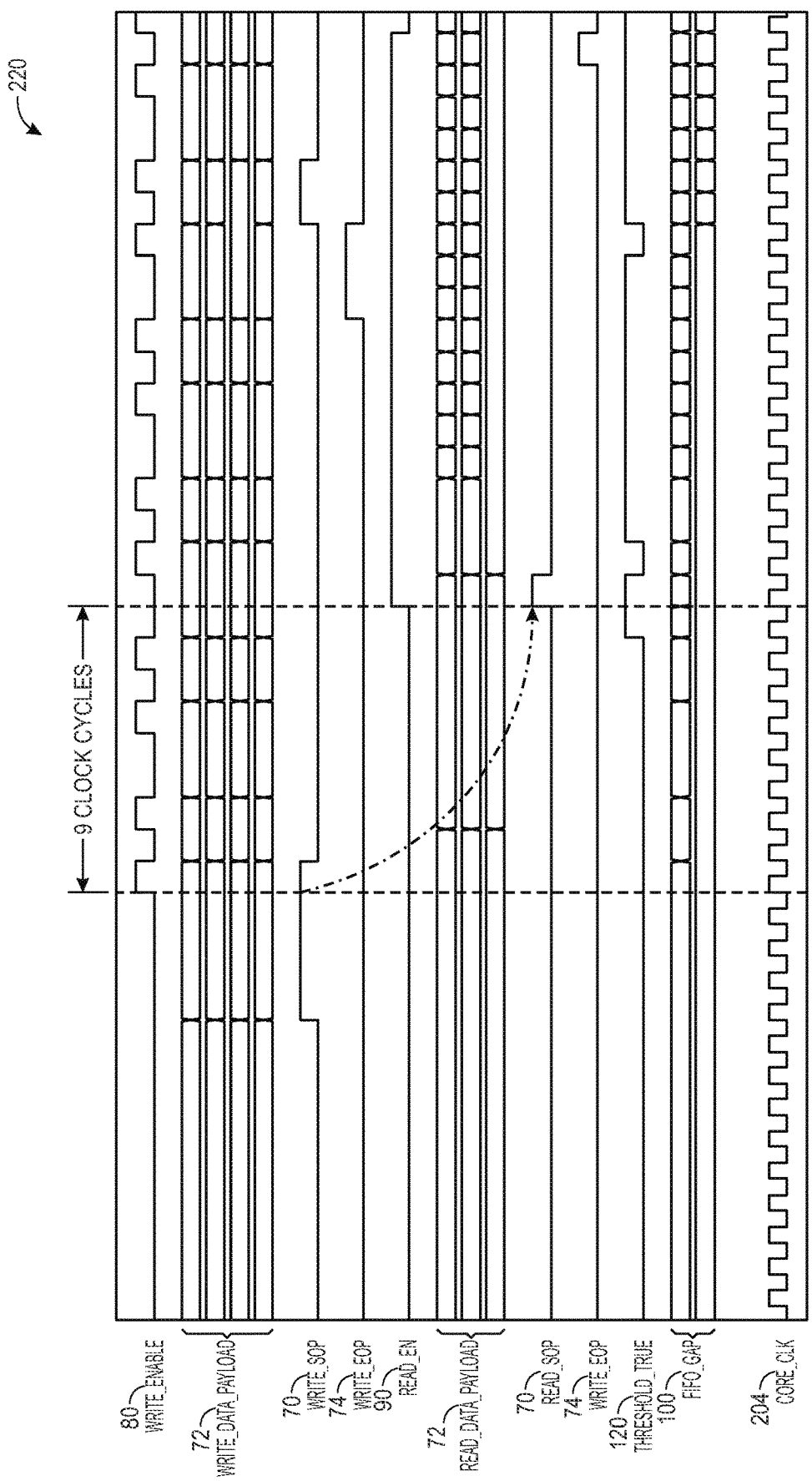
FIG. 6 depicts a data graph to illustrate data signals of a FIFO crossing-over a long packet when performing lookahead operations and operating at store and forward mode.

Referring now to FIG. 6, a data graph 220 may illustrate data signals of the FIFO 60 of FIG. 3 crossing-over data when operating at store and forward mode to transfer a long packet with 256 data bytes using lookahead operations. The data graph 220 may illustrate relationship between the write enable signal 80 along with the SOP 70, data payload 72, and the EOP 74 being written to the FIFO 60 at the inlet 78. Moreover, the data graph 220 may also depict the data payload 72, the SOP 70, and the EOP 74 being read from the FIFO 60 at the outlet 88, with respect to the read enable signal 90, the threshold true signal 120, the FIFO gap signal 100, and the core clock signal 204 associated with the FIFO 60.

In the depicted embodiment, the FIFO 60 may start clocking-out the stored data based on monitoring and detecting storage of the threshold number of data entries in the memory 64. In the depicted embodiment, the threshold number of data entries is 22 data entries (16 in Hexadecimal). The FIFO 60 may start clocking-out the SOP 70 based on detecting the threshold true signal 120. For example, a comparator, such the comparator circuitry 108, may output the threshold true signal 120 when the FIFO gap signal 100 becomes equal or greater than the threshold number of data entries.

Accordingly, in the depicted embodiment of FIFO 60 transferring the long packet with 256 data bytes using lookahead operations, the FIFO may start clocking-out the packet after clocking-in 22 data entries of the packet for timely clocking-out the stored data. The threshold number of data entries may be based on the predetermined read enable threshold signal 112 or the programmable read enable threshold signal 114. As illustrated, the read enable signal 90 may be triggered after a threshold number of stored data entries is detected. As such, the FIFO 60 allows transmission of the stored data 9 clock cycles after receiving the write enable signal 80.

Instead of the long packet with 256 data bytes illustrated in FIG. 6, when the FIFO 60 transfers a long packet including 512 data bytes similar to the long packet of FIG. 5 by performing the lookahead operations, the FIFO may start clocking-out the packet 18 clock signals after receiving the write enable signal 80. That is, with similar write clock signal 84, read clock signal 86, and packet size, total FIFO latency may be reduced by >50% when performing lookahead operations in store and forward mode.

Figure 7:
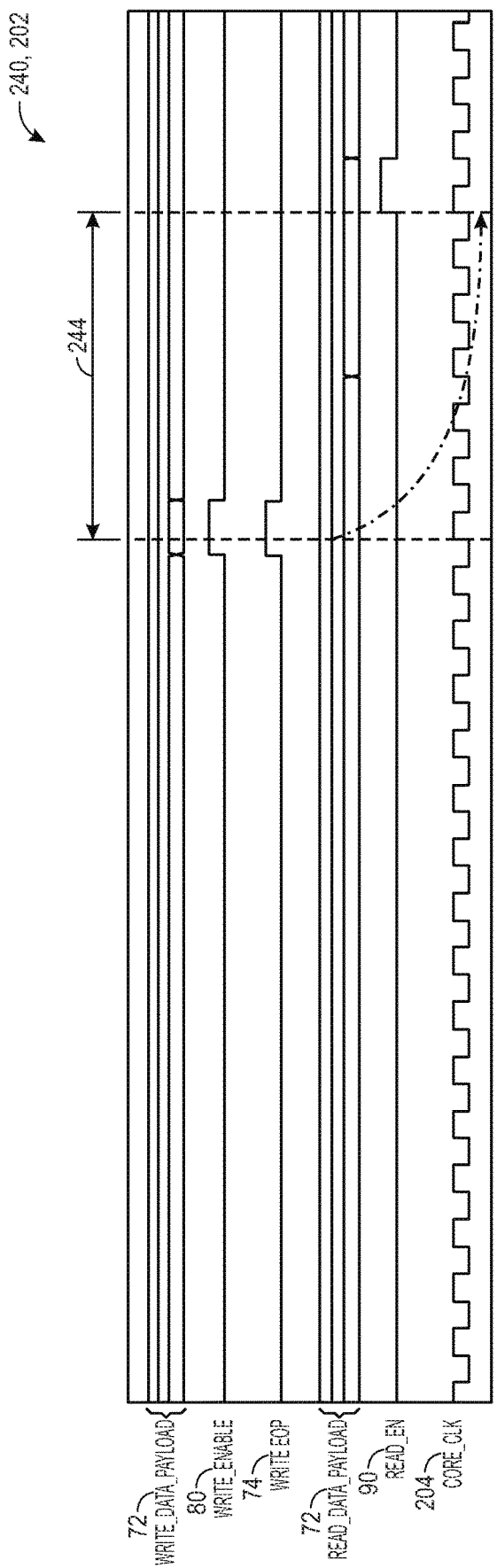
FIG. 7 depicts a data graph to illustrate data signals of a FIFO crossing-over a short packet operating at store and forward mode without performing lookahead operations.

Referring now to FIG. 7, a data graph 240 may illustrate data signals of the FIFO 202 (not shown) crossing-over data when operating at store and forward mode to transfer a short packet with 139 data bytes. The FIFO 202 may allow transmission of stored data (data payload 72) from the memory of the FIFO 202 only after a worst-case threshold amount of time 244 after detecting the EOP 74 of the packet. In the depicted example, the worst-case threshold amount of time 244 corresponds to 6 clock cycles of the core clock signal 204. The worst-case threshold amount of time may ensure that an entire packet has been written to the memory of the FIFO before clocking-out the packet.

Figure 8:
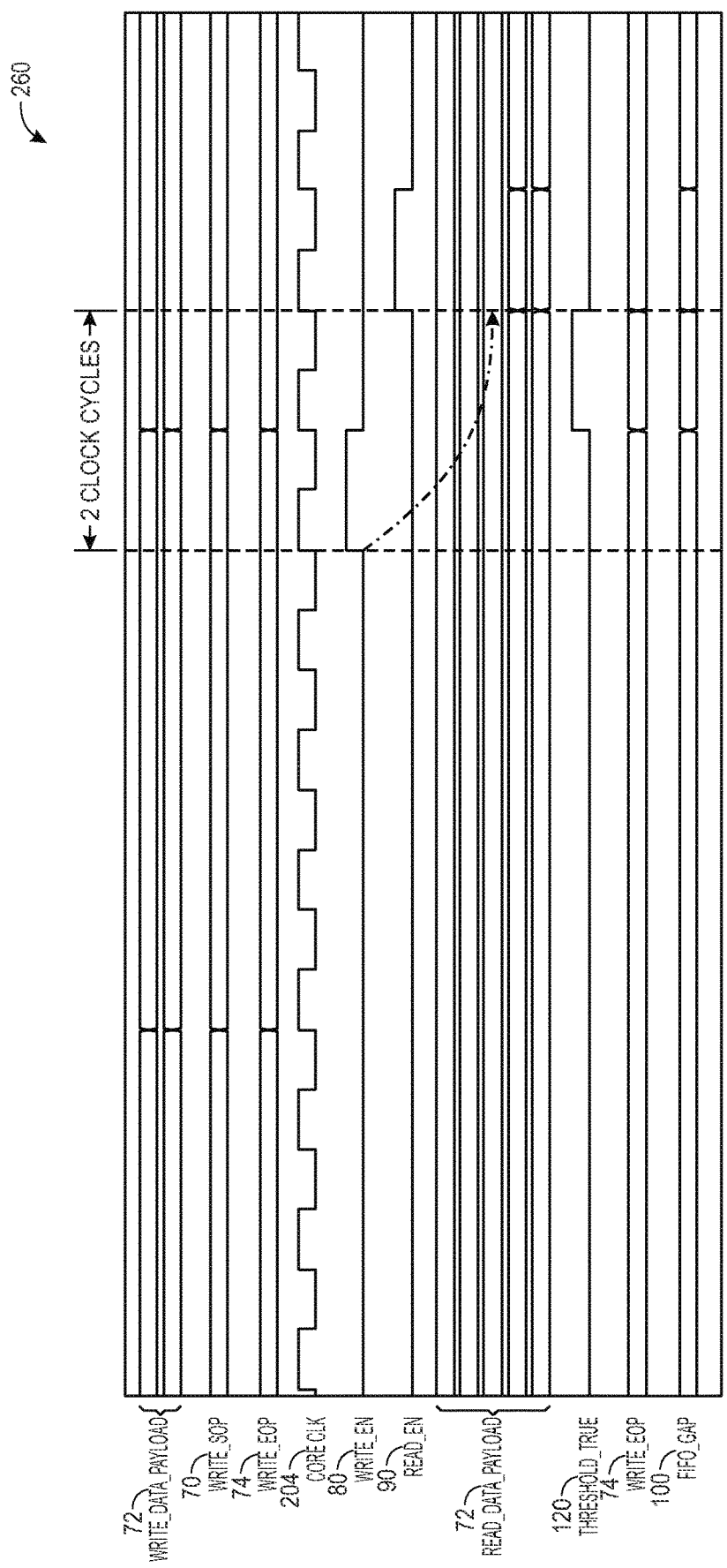
FIG. 8 depicts a data graph to illustrate data signals of a FIFO crossing-over a short packet when performing lookahead operations and operating at store and forward mode.

In FIG. 8, the FIFO 60 may be used to perform lookahead operations in store and forward mode with the same short packet with 139 data bytes as the embodiment of FIG. 7. The FIFO 60 may start clocking-out the packet only 2 clock cycles after detecting the EOP 74 of the packet. This may eliminate the requirement for waiting a threshold amount of time to ensure storage of the packet on the memory 64. This is because the lookahead circuitry 62 may trigger the read enable signal 90 based on detecting the EOP 74, which indicates that the packet has been fully loaded, even though it is smaller than the expected packet size or the worst-case packet size.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. Moreover, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

Example Embodiments of the Disclosure The following numbered clauses define certain example embodiments of the present disclosure.

Example Embodiment 1

A First-In First-Out Buffer (FIFO) Comprising:
a memory that stores data in a number of memory entries of the memory using a first clock signal and allows reading the data stored in the number of memory entries using a second clock signal in response to receiving a read enable signal, wherein the data is associated with a packet; and
lookahead circuitry that detects whether the data is written in a threshold number of memory entries less than the number of memory entries, wherein the lookahead circuitry provides the read enable signal based on detecting that the data is written in at least the threshold number of memory entries.

Example Embodiment 2

The FIFO of example embodiment 1, wherein the first clock signal is received from a first integrated circuit and the second clock signal is received from a second integrated circuit, wherein the first clock signal has a lower clock frequency than the second clock signal.

Example Embodiment 3

The FIFO of example embodiment 2, wherein the second clock signal operates at at least twice the frequency of the first clock signal.

Example Embodiment 4

The FIFO of example embodiment 1, wherein respective memory entries of the number of memory entries store a plurality of data bytes.

Example Embodiment 5

The FIFO of example embodiment 1, wherein the data written in the threshold number of memory entries is associated with a portion of the packet and the read enable signal is received before storing the packet completely.

Example Embodiment 6

The FIFO of example embodiment 1, wherein the FIFO is configured to allow reading the stored data associated with the packet while storing the data associated with a remaining portion of the packet.

Example Embodiment 7

The FIFO of example embodiment 1, wherein the lookahead circuitry receives a read enable threshold signal indicative of the threshold number of data entries and a FIFO gap signal indicative of a number of written data entries, compares the read enable threshold signal and the FIFO gap signal, and provides the read enable signal based on the comparison.

Example Embodiment 8

An electronic system comprising:
a first integrated circuit transmitting a data packet using a first clock frequency;
a second integrated circuit receiving the data packet using a second clock frequency; and
a first-in first-out buffer (FIFO) comprising:
a memory that stores data in a number of memory entries of the memory using a first clock signal and allows reading the data stored in the number of memory entries using the second clock frequency in response to receiving a read enable signal, wherein the data is associated with the data packet; and
lookahead circuitry that detects whether the data is written in a threshold number of memory entries less than the number of memory entries, wherein the lookahead circuitry provides the read enable signal based at least in part on detecting that the data is written in the threshold number of memory entries.

Example Embodiment 9

The system of example embodiment 8, wherein each memory entry of the number of memory entries is configured to store a plurality of data bytes.

Example Embodiment 10

The system of example embodiment 8, wherein the data written in the threshold number of memory entries is associated with a portion of the data packet and the read enable signal is received before storing the data packet completely.

Example Embodiment 11

The system of example embodiment 8, wherein the FIFO is configured to allow reading the stored data associated with the data packet while storing the data associated with a remaining portion of the data packet.

Example Embodiment 12

The system of example embodiment 8, wherein the lookahead circuitry receives a read enable threshold signal indicative of the threshold number of memory entries and a FIFO gap signal indicative of a number of written memory entries, compares the read enable threshold signal and the FIFO gap signal, and provides the read enable signal based at least in part on the comparison.

Example Embodiment 13

The system of example embodiment 8, wherein the second clock frequency is at least double the first clock frequency.

Example Embodiment 14

A method, comprising:
receiving, by a first-in first-out buffer (FIFO), data associated with a packet from a first integrated circuit using a first clock signal;
storing, on a memory of the FIFO, the data in a number of data entries of the memory using the first clock signal;

providing, by a lookahead circuitry associated with the FIFO, a read enable signal based on detecting that a portion of the packet is written in a threshold number of data entries less than the number of data entries; and allowing, by the FIFO, transmission of the stored data to a second integrated circuit using a second clock signal while storing a remaining portion of the packet in response to the read enable signal.

Example Embodiment 15

The method of example embodiment 14, wherein transmission of the stored data results in transmission of the end of the packet one or more clock cycles after storing the end of the packet.

Example Embodiment 16

The method of example embodiment 14, wherein storing the data in the number of data entries comprises determining a jump pointer value based on a location of a read pointer of the memory and using the jump pointer value to adjust the read pointer before storing the data in the number of data entries.

Example Embodiment 17

The method of example embodiment 14, wherein the read enable signal is received before storing the packet completely.

Example Embodiment 18

The method of example embodiment 14, wherein allowing transmission of the stored data associated with the packet is simultaneous to storing the remaining portion of the packet.

Example Embodiment 19

The method of example embodiment 14, wherein providing the read enable signal by the lookahead circuitry comprises:
selecting, by the lookahead circuitry, a read enable threshold signal indicative of the threshold number of data entries between a specified value and a programmed value;
receiving, by the lookahead circuitry, a FIFO gap signal indicative of a number of written data entries in the memory; and
providing, by the lookahead circuitry, the read enable signal based on comparing the read enable threshold signal and the FIFO gap signal.

Example Embodiment 20

The method of example embodiment 19, wherein:
the specified value is determined based at least in part on:
a specified worst-case value for the first clock signal and the second clock signal representing a highest expected difference between clock frequencies of the first clock signal and the second clock signal; and
a worst-case size of the packet representing a highest number of data bytes that the packet is expected to hold; and
the programmed value is determined based on determining a lower difference between clock frequencies of the first clock signal and the second clock signal than the predetermined worst case value, determining a shorter packet size, or both.

Example Embodiment 21

The method of example embodiment 20, wherein the specified value is determined before runtime.

What is claimed is:

1. A first-in first-out buffer (FIFO) comprising:
a memory that stores data in a plurality of memory entries of the memory using a first clock signal and outputs the stored data using a second clock signal in response to receiving a read enable signal; and
lookahead circuitry configured to:
determine a threshold number of memory entries less than the plurality of memory entries based on determining a difference between frequencies of the first clock signal and the second clock signal;
track a number of memory entries of the plurality of memory entries storing at least a portion of the data; and
generate the read enable signal based on the threshold number of memory entries storing the portion of the data.

2. The FIFO of claim 1, wherein the first clock signal is received from a first integrated circuit and the second clock signal is received from a second integrated circuit, wherein the first clock signal has a lower clock frequency than the second clock signal.

3. The FIFO of claim 2, wherein the second clock signal operates at least twice the frequency of the first clock signal.

4. The FIFO of claim 1, wherein at least one memory entry of the number of memory entries stores a plurality of data bytes.

5. The FIFO of claim 1, wherein the data stored in the threshold number of memory entries is associated with a portion of a packet and the read enable signal is received before storing the packet completely.

6. The FIFO of claim 1, wherein the FIFO is configured to allow reading the stored portion of the data while storing a remaining portion of the data associated with a packet in response to the read enable signal.

7. The FIFO of claim 1, wherein the lookahead circuitry receives a read enable threshold signal indicative of the threshold number of data entries and a FIFO gap signal indicative of a number of stored data entries, compares the read enable threshold signal and the FIFO gap signal, and provides the read enable signal based on the comparison.

8. An electronic system comprising:
a first integrated circuit transmitting a data packet using a first clock frequency;
a second integrated circuit receiving the data packet using a second clock frequency; and
a first-in first-out buffer (FIFO) comprising:
a memory that stores data of the data packet in a plurality of memory entries of the memory using the first clock frequency and outputs the stored data using the second clock frequency in response to receiving a read enable signal; and
lookahead circuitry configured to:
determine a threshold number of memory entries less than the plurality of memory entries based on determining a difference between frequencies of the first clock signal and the second clock signal;

track a number of memory entries of the plurality of memory entries storing at least a portion of the data; and generate the read enable signal based on the threshold number of memory entries storing the portion of the data.

9. The system of claim 8, wherein each memory entry of the number of memory entries is configured to store a plurality of data bytes.

10. The system of claim 8, wherein the stored data in the threshold number of memory entries is associated with a portion of the data packet and the read enable signal is received before storing the data packet completely.

11. The system of claim 8, wherein the FIFO is configured to allow reading the stored portion of the data while storing a remaining portion of the data associated with the data packet in response to the read enable signal.

12. The system of claim 8, wherein the lookahead circuitry receives a read enable threshold signal indicative of the threshold number of memory entries and a FIFO gap signal indicative of the number of memory entries having the portion of the data stored thereon, compares the read enable threshold signal and the FIFO gap signal, and provides the read enable signal based at least in part on the comparison.

13. The system of claim 8, wherein the second clock frequency is at least double the first clock frequency.

14. A method, comprising:
receiving, by a first-in first-out buffer (FIFO), data associated with a packet from a first integrated circuit using a first clock signal;
determining, by a lookahead circuitry associated with the FIFO, a threshold number of data entries based on determining a difference between frequencies of the first clock signal and a second clock signal, wherein the threshold number of data entries is less than a plurality of data entries of a memory of the FIFO for storing the data;
tracking, by the lookahead circuitry, a number of data entries of the plurality of data entries storing at least a portion of the data;
generating, by the lookahead circuitry, a read enable signal based on the threshold number of data entries storing the portion of the data; and
allowing, by the FIFO, transmission of the portion of the data to a second integrated circuit using the second clock signal while storing a remaining portion of the data in response to the read enable signal.

15. The method of claim 14, wherein transmission of the portion of the data results in transmission of an end of the packet one or more clock cycles after storing the end of the packet.

16. The method of claim 14, wherein storing the data in the number of data entries comprises determining a jump pointer value based on a location of a read pointer of the memory and using the jump pointer value to adjust the read pointer before storing the data in the number of data entries.

17. The method of claim 14, wherein the read enable signal is received before storing the packet completely.

18. The method of claim 14, wherein allowing transmission of the stored portion of the data is simultaneous to storing the remaining portion of the data.

19. The method of claim 14, wherein generating the read enable signal by the lookahead circuitry comprises:
selecting, by the lookahead circuitry, a read enable threshold signal indicative of the threshold number of data entries between a specified value and a programmed value;
receiving, by the lookahead circuitry, a FIFO gap signal indicative of the number of the data entries having the portion of the data stored thereon; and
providing, by the lookahead circuitry, the read enable signal based on comparing the read enable threshold signal and the FIFO gap signal.

20. The method of claim 19, wherein:
the specified value is determined based at least in part on:
a specified worst-case value for the first clock signal and the second clock signal representing a highest expected difference between clock frequencies of the first clock signal and the second clock signal; and
a worst-case size of the packet representing a highest number of data bytes that the packet is expected to hold; and
the programmed value is determined based on determining a lower difference between clock frequencies of the first clock signal and the second clock signal than the specified worst-case value, determining a shorter packet size, or both.

21. The method of claim 20, wherein the specified value is determined before runtime.

* * * * *